US012568987B2

(12) United States Patent (10) Patent No.: US 12,568,987 B2
Anantharaman et al. (45) Date of Patent: Mar. 10, 2026

(54) READY-TO-DRINK COFFEE BEVERAGES AND METHOD OF MAKING THEREOF

(71) Applicant: SOCIETE DES PRODUITS NESTLE S.A., Vevey (CH)

(72) Inventors: Helen Gillian Anantharaman, Powell, OH (US); Guillermo E. Napolitano, Dublin, OH (US); Yubin Ye, Dublin, OH (US); Jun-Tse Ray Fu, Dublin, OH (US); Philippe Rousset, Dublin, OH (US); Alexander A. Sher, Dublin, OH (US)

(73) Assignee: Societe des Produits Nestle S.A., Vevey (CH)

( * ) Notice: Subject to any disclaimer, the term of this patent is extended or adjusted under 35 U.S.C. 154(b) by 493 days.

(21) Appl. No.: 16/639,625

(22) PCT Filed: Aug. 16, 2018

(86) PCT No.: PCT/EP2018/072165
§ 371 (c)(1),
(2) Date: Feb. 17, 2020

(87) PCT Pub. No.: WO2019/034715
PCT Pub. Date: Feb. 21, 2019

(65) Prior Publication Data
US 2020/0236962 A1 Jul. 30, 2020

Related U.S. Application Data

(60) Provisional application No. 62/547,201, filed on Aug. 18, 2017.

(51) Int. Cl.
*A23F 5/24* (2006.01)
*A23F 5/14* (2025.01)
(Continued)

(52) U.S. Cl.
CPC .............. *A23F 5/243* (2013.01); *A23F 5/14* (2013.01); *A23L 29/272* (2016.08); *A23L 33/115* (2016.08);
(Continued)

(58) Field of Classification Search
CPC .... A23L 33/185; A23L 33/115; A23L 29/272; A23L 33/16; A23L 33/12; A23L 33/125;
(Continued)

(56) References Cited

U.S. PATENT DOCUMENTS 9,414,622 B2 * 8/2016 Pereyra .................... A23L 7/10

FOREIGN PATENT DOCUMENTS

JP         2012525123 A    10/2012
WO        2012027285       3/2012
(Continued)

OTHER PUBLICATIONS

"Have You Ever Added Baking Soda to Your Coffee?"; kitchn; Jan. 11, 2017 [online]; [retrieved Jun. 3, 2021]. Retrieved from the Internet <https://www.thekitchn.com/have-you-ever-added-baking-soda-to-your-coffee-239348> (Year: 2017).*
(Continued)

*Primary Examiner* — Nikki H. Dees
(74) *Attorney, Agent, or Firm* — K&L Gates LLP

(57) ABSTRACT

Ready to drink coffee beverages are provided. The beverage comprises coffee; medium chain triglycerides (MCT); high acyl gellan gum; plant-based protein; and buffer wherein coffee is 0.5-2.5 w/w %, and MCT is 5-10 w/w %. The beverage can be refrigerated and shelf-stable in a homogenous state for at least six months at 4, 20 and 30° C.

19 Claims, 1 Drawing Sheet

(51) Int. Cl.

| | | |
|---|---|---|
| *A23L 29/269* | (2016.01) | |
| *A23L 33/115* | (2016.01) | |
| *A23L 33/185* | (2016.01) | |

(52) U.S. Cl.

CPC ....... *A23L 33/185* (2016.08); *A23V 2200/212* (2013.01)

(58) Field of Classification Search

CPC ... A23F 5/243; A23F 5/14; A23F 5/46; A23V 2200/212

See application file for complete search history.

(56) References Cited

FOREIGN PATENT DOCUMENTS

| WO | | 2012143515 | | 10/2012 | | |
|---|---|---|---|---|---|---|
| WO | WO-2012143515 | A1 | * | 10/2012 | ............. | A23C 11/02 |
| WO | | 2013078510 | | 6/2013 | | |
| WO | | 2015185372 | | 12/2015 | | |
| WO | WO-2015185372 | A1 | * | 12/2015 | ............. | A23F 5/243 |
| WO | | 2017063942 | A1 | 4/2017 | | |
| WO | | 2017098022 | | 6/2017 | | |

OTHER PUBLICATIONS

"The Difference Between MCT and Coconut Oil—And How To Use Each"; The Vitamin Shoppe; Jun. 6, 2018 [online]; [retrieved Jun. 14, 2021]. Retrieved from the Internet <https://whatsgood.vitaminshoppe.com/coconut-oil-vs-mct-oil/> (Year: 2018).*

Carrageenan Backlash: Food Firms Are Ousting A Popular Additive, The Salt, Dec. 12, 2016 [online], [retrieved Dec. 9, 2021]. Retrieved from the Internet <https://www.npr.org/sections/thesalt/2016/12/12/504558025/carrageenan-backlash-why-food-firms-are-ousting-a-popular-additive. (Year: 2016).*

Vannice G, et al; "Position of the Academy of Nutrition and Dietetics: Dietary Fatty Acids for Healthy Adults"; Journal of the Academy of Nutrition and Dietetics, vol. 114, No. 1, Jan. 2014 (Year: 2014).*

Dudlicel ST, "Aseptic Acceptance," Oct. 1, 2005, From the Internet May 1, 2023, <url=https://www.dairyfoods.com/articles/86945-aseptic-acceptance> (Year: 2005).*

Unknown, "Mintel—Unsweetened Full Shot Cold Brew Coffee with Almond Milk and Coconut Cream" Apr. 2016, 4 pages.

Japan Patent Office Communication for Application No. P2020-506236, Dispatch No. 227659, Dispatch Date May 24, 2022, 4 pages.

Norulaini et al., "Effects of Supercritical Carbon Dioxide Extraction Parameters on Virgin Coconut Oil Yield and Medium-Chain Triglyceride Content", Food Chemistry, vol. 116, Issue No. 1, 2009, pp. 193-197.

Australian Office Action for Appl No. 2018316501 dated Oct. 12, 2023.

* cited by examiner

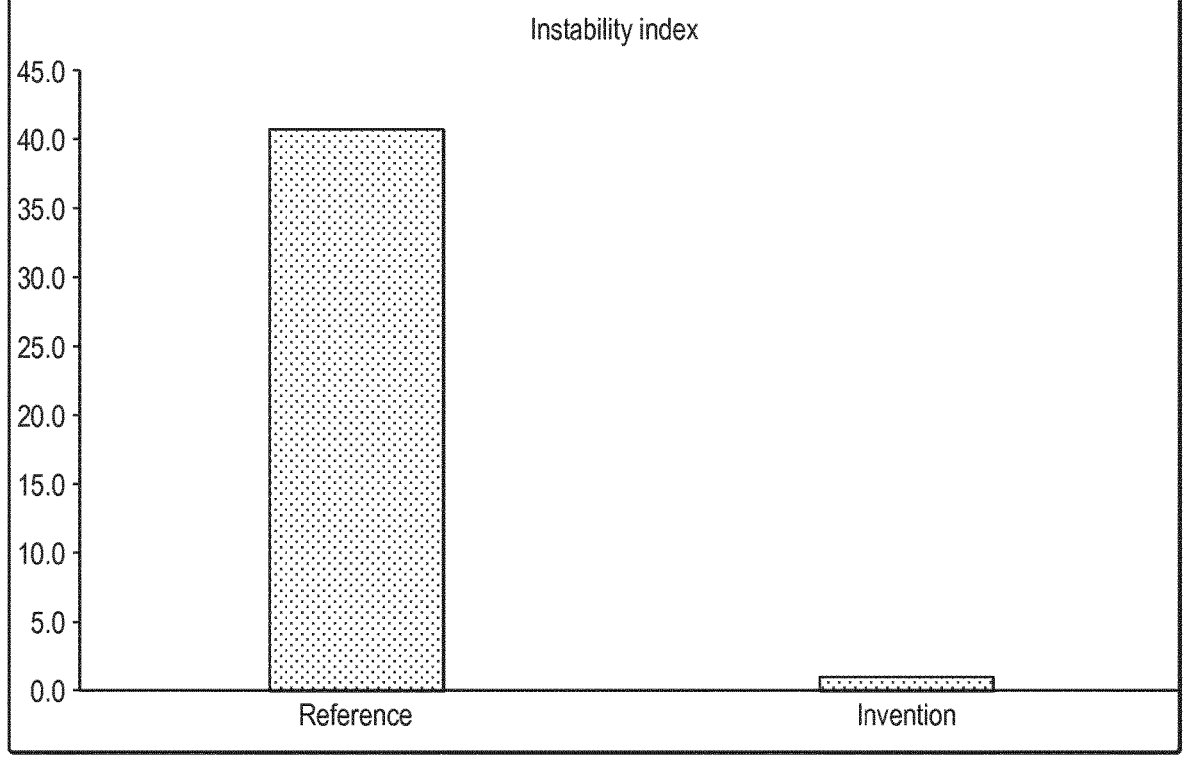

READY-TO-DRINK COFFEE BEVERAGES AND METHOD OF MAKING THEREOF

CROSS REFERENCE TO RELATED APPLICATIONS

The present application is a National Stage of International Application No. PCT/EP2018/072165, filed on Aug. 16, 2018, which claims priority to U.S. Provisional Patent Application No. 62/547,201, filed on Aug. 18, 2017, the entire contents of which are being incorporated herein by reference.

BACKGROUND

The present disclosure generally relates to a nutritional product. More specifically, the present disclosure is directed to ready to drink ("RTD") coffee beverages of a low calorie content and comprising Medium-chain-triglycerides (MCT).

Consumers are often looking for healthy beverages but without compromising the taste and texture. In addition, consumers are looking for good mouthfeel, also denoted as richness, texture or creaminess, of the beverages.

MCT related products are known in the market, for instance medical drink BETAQUIK® which is a ready to drink liquid emulsion with 20% MCT. The product is advised to be used under medical supervision. It can be added to coffee or tea but this is not RTD coffee beverage. Similarly there also exists a MCT oil powder from Quest nutrition which can be added externally to prepare a beverage. This is not a RTD coffee beverage. Thus, there is a need for RTD beverage with MCT.

MCTs are absorbed and metabolized rapidly in the body and have long been used in clinical applications to treat malabsorption. MCT are converted to ketone bodies by the liver and can be used as an alternative to glucose as a source of energy to the brain.

The health benefits of MCT are:

Readily absorbed and digested

Maintain of cognitive function

Modulate neural activity.

At the same time, when improving texture perception of RTD beverages, the long shelf life stability of the beverage cannot be compromised. In order to increase beverage stability, mouthfeel there is a need of solution(s) that allows to have homogeneous RTD beverages without phase separation during shelf-life.

Such stability is challenging because ingredients added to the beverage may cause product destabilization, such as undesirable increase of product viscosity and phase separation, e.g. gelation, syneresis, layering, creaming and/or sedimentation.

The majority of existing products containing MCT do not have good mouthfeel and are not in RTD format Therefore, there is a need for RTD beverage which provides convenience for product consumption and have good mouthfeel but without compromising physical stability and taste profile during shelf-life.

The preset invention relates to the substantiated health benefits of MCT (medium chain triglycerides) in the RTD coffee format which is shelf stable without physico-chemical instability issues while providing a pleasant texture/mouthfeel.

In addition, it also provides benefits associated with coffee.

SUMMARY

The present invention generally relates to a read-to-drink (RTD) beverage comprising coffee; medium chain triglycerides (MCT); high acyl gellan gum; plant-based protein; and buffer, wherein coffee is 0.5-2.5 w/w %, and MCT is 5-10 w/w %.

In one embodiment the composition is a RTD aseptic coffee beverage. The beverage can have can have reduced sugar, can be ready to drink and can have a pleasant mouth feel. The beverage can have good physical chemical stability during ambient storage times e.g., stable for at least six months at 4, 20 and 30° C. The beverage can also overcome problems with phase separation such as sedimentation, syneresis, creaming, viscosity change, age gelation, and other phase separation/instability issues during different storage conditions over the full life of the coffee beverage.

Using novel technology we developed a RTD coffee containing 10-20 g of MCT/200-ml serving. It was surprisingly found that the novel combination of hydrocolloids and emulsifiers in the specific concentration provides a good shelf life stability without compromising texture/mouthfeel. The emulsifier is a plant protein. One of the example of plant protein is a pea protein.

Usually, addition of coffee brakes oil-in-water emulsion when emulsifier is a protein. The plant proteins can include but not limited to grain, legume, cucurbita and nut proteins.

However, we unexpectedly found that use of plant protein such as pea protein in the specific ratio in combination with gellan provide desired emulsion stability. Moreover, the MCT RTD coffee has no other instability issues such as phase separation (layering, sineresis, sedimentation, etc.).

It was surprisingly found that composition of the present invention comprising a hydrocolloid texturizing/stabilizing system comprising high acyl gellan gum resulted in a good mouthfeel. The other advantage of the composition of the present invention is that it also overcomes phase separation, off taste, instability and viscosity change during shelf-life. The composition of the present invention provides shelf-life stability without phase separation, gelation, sedimentation, creaming, syneresis.

The invention also provides the aseptic RTD beverages that maintain practically constant product viscosity during refrigerated and ambient storage.

The recipe may optionally comprise cocoa, different flavors, sweeteners, vitamins and minerals.

In another aspect, the present invention relates to a method of producing a ready to drink coffee beverage comprising the steps of:

adding a high acyl gellan gum, sugar, and buffer;

adding plant-based protein and a coffee component;

adding MCT oil followed by a UHT treatment for 2-6 sec at 141-148° C., cooling to about 15-25° C.; homogenization at about 135/35 bars at 70-80° C. and filling in a container under aseptic conditions.

BRIEF DESCRIPTION OF FIGURES

FIG. 1 represents the Instability Index of the reference beverage and beverage of the invention.

DETAILED DESCRIPTION

The term "Medium-chain-triglycerides (MCT)" comprises C8:0 and C10:0 (50-65%):(34-45%) respectively, and C12:0 is less than 2.5%.

All percentages expressed herein are by weight of the total weight of the beverage composition unless expressed otherwise. All dosage ranges contained within this application are intended to include all numbers, whole or fractions, contained within said range. As used in this disclosure and the appended claims, the singular forms "a," "an" and "the" include plural referents unless the context clearly dictates otherwise. As used herein, "about" is understood to refer to numbers in a range of numerals. Moreover, all numerical ranges herein should be understood to include all integer, whole or fractions, within the range.

The present disclosure relates to RTD coffee beverages. The beverage is refrigerated or shelf-stable coffee-based RTD beverage. The coffee beverage can be shelf-stable for at least six months at 4, 20° C. and 30° C.

A unique combination of components were surprisingly found for a stabilizing/texturizing system that can provide aseptic RTD beverages with good physical chemical stability during storage while also providing good mouthfeel and a pleasant, refreshing taste. The stabilizing system improves the stability of refrigerated and aseptic shelf-stable RTD coffee containing beverages by helping to avoid phase separation, gelation, creaming, syneresis, etc., during the refrigerated and ambient storage of the beverage. In a general embodiment, the present disclosure provides a beverage including plant proteins, water, coffee, and a stabilizing/texturizing system. The water added to the make the beverage can be treated/filtered water, e.g., reverse osmosis ("RO") treated water, with a total hardness of less than 10 ppm (e.g., as CaCO3). The stabilizing system has high acyl gellan gum. The system may also comprise guar gum, pectin, starch and/or combinations thereof.

The molecular structure of high acyl gellan gum is a straight chain based on repeating glucose, rhamnose, and glucuronic acid units. The term "high acyl gellan gum" refers to high acyl form with two acyl substituents being acetate and glycerate. Both substituents are located on the same glucose residue, and on average, there is one glycerate per repeat and one acetate per every two repeats. The amount of a high acyl gellan gum ranges from 0.01 to 0.04% by weight.

In an embodiment term "coffee" would include soluble coffee extract, instant coffee, cold brew, roasted & ground derived and micronized coffee and combinations thereof.

Proteins can be used as emulsifiers in liquid beverages. The plant proteins can include but not limited to grain, legume, cucurbita and nut proteins.

The protein the RTD beverage is based on plant based protein such as pea protein ranging from 0.3 to 1 w/w %.

The sugar in the RTD beverage may comprise sucrose, lactose, glucose and/or fructose. In another embodiment, the sugar ranges from about 0% to about 10%.

The coffee beverages can also include one or more ingredients such as flavors, sweeteners, colorants or a combination thereof. Sweeteners can include, for example, sucrose, sucralose, acesulfame K, fructose, dextrose, maltose, dextrin, levulose, tagatose, galactose, corn syrup solids and other natural or artificial sweeteners. Sugarless sweeteners can include, but are not limited to, sugar alcohols such as maltitol, xylitol, sorbitol, erythritol, mannitol, isomalt, lactitol, hydrogenated starch hydrolysates, and the like, alone or in combination.

Usage level of the flavors, sweeteners and colorants will vary greatly and will depend on such factors as potency of the sweetener, desired sweetness of the beverage, the level and type of flavor used, and cost considerations. Any suitable combinations of sugar and/or sugarless sweeteners may be used in the chocolate beverages. In an embodiment, the sweetener is present in the coffee beverage at a concentration ranging from about 0.001% to about 1% by weight. In another embodiment, the artificial sweetener is present in an amount ranging from about 0.001% to about 0.1% by weight.

Non-limiting examples of suitable flavors include coffee enhancers, cream/dairy enhancers, vanilla flavors or a combination thereof. The flavor(s) can be present in an amount ranging from about 0.01% to about 0.5% by weight.

The coffee beverages can be made using any suitable process. For example, a process of making the coffee beverages includes dissolving the raw materials in fluid milk/water and hydration (e.g., wetting) of a coffee powder to form the beverage. The beverage can then be subjected to ultra-high temperature ("UHT") heat treatment, homogenization at about 135/35 bars at 70-75° C. before and/or after UHT treatment for 5 sec at 141-143° C., cooling to about 15-25° C. and filling in a container under aseptic conditions.

In an embodiment, the beverage further includes one or more starches. The starch can help to maintain good dispersion stability, avoid syneresis and other phase separation issues during the storage, and improve mouthfeel. The starch can be, for example, corn starch, rice starch, potato starch or a combination of different starches. In a preferred embodiment, the starch level ranges from about 0.05% to about 3% by weight of composition.

In an embodiment, the coffee beverage may further include one or more vitamins and/or minerals. The vitamins can be in an amount ranging from about 0.01% to about 0.5% by weight. The vitamins include, but are not limited to, vitamin C and group B vitamins. Non-limiting examples of suitable vitamins include ascorbic acid, ascorbyl palmitate, vitamins B1, B2, B6, B12, and Niacin (B3), or combination of thereof. The vitamins may also include Vitamins A, D, E and K and acid vitamins such as pantothenic acid and folic acid and biotin.

The minerals can be in an amount ranging from about 0.0025% to about 1% by weight. Non-limiting examples of the minerals include calcium, magnesium, iron or a combination thereof. The source of calcium can include calcium carbonate, calcium phosphate, calcium citrate, other insoluble calcium compounds or a combination thereof. The source of magnesium can include magnesium phosphate, magnesium carbonate, magnesium hydroxide or combination of thereof. The source of iron can include iron ammonium phosphate, ferric pyrophosphate, ferric phosphate, ferrous phosphate, other insoluble iron compounds, aminoacids, iron chelating compounds such as EDTA, or combination of thereof. The minerals may also include zinc, iodine, copper, phosphorus, manganese, potassium, chromium, molybdenum, selenium, nickel, tin, silicon, vanadium and boron.

In an embodiment, the coffee beverage may further include one or more amino acids. Non-limiting examples of amino acids include Isoleucine, Alanine, Leucine, Asparagine, Lysine, Aspartate, Methionine, Cysteine, Phenylalanine, Glutamate, Threonine, Glutamine, Tryptophan, Glycine, Valine, Proline, Serine, Tyrosine, Arginine, Histidine or a combination thereof.

In another embodiment, the coffee beverage may further include one or more prebiotics. Non-limiting examples of prebiotics include fructooligosaccharides, inulin, lactulose, galactooligosaccharides, soyoligosaccharides, xylooligosaccharides, isomaltooligosaccharides, gentiooligosaccharides, lactosucrose, glucooligosaccharides, pecticoligosaccharides, resistant starches, sugar alcohols or a combination thereof.

EXAMPLES

By way of example and not limitation, the following examples are illustrative of various embodiments of the present disclosure. In this and in the all other examples of the invention, concentrations of ingredients are given as w/w % based on the whole product formulation. Beverage physical stability was evaluated using a Lumisizer Model 611. Lumisizer works on the principle of centrifugation of samples (at 2300 g-force, 120 min). Transmission profiles are generated, and Space and Time resolved extinction coefficients of the samples are recorded. The difference in the separation rates (expressed as Instability Index) between sample and reference allows to assess relative physical stability of the products against sedimentation and/or creaming.

Example 1

The MCT coffee beverages were prepared using 10 kg of MCT and 4 kg of sugar, 1 kg of Arabica coffee powder, 600 g of pea protein, 30 g of high acyl gellan gum, 100 g of sodium bicarbonate, and water necessary to reach 100 kg of the final beverage.

The method of producing this MCT coffee beverage comprises the process steps in order as follows:

A high acyl gellan gum was dry blended with sugar and buffer salt, and then were added under high agitation to a separate tank containing water Coffee powder was pre-dissolved in some amount of water and then added to the tank Pea protein was added MCT oil was pour into the tank under high agitation and some shear force to create preliminary emulsion The product was subjected to ultra-high temperature (UHT) heat treatment at about 142° C. for about 3 sec.

Then the product was subjected to homogenization at 135/35 bars at 75° C.

The product was cooled down to 20° C. and aseptic filling of the RTD beverage into a suitable aseptic container, e.g., PET bottles, Tetra Pak®, jars, jugs or pouches.

Physico-chemical properties of the beverage were evaluated by instrumental methods and were judged by sensory panelists. No phase separation (syneresis, creaming, marbling, etc.), gelation, and practically no viscosity changes were found during the storage. It was surprisingly found that the beverage has good appearance, mouthfeel, smooth texture and a good flavor without "off" taste.

The product of the invention has significantly lower instability index as compared to that of the reference (FIG. 1), where the reference beverage was prepared by using the same formulation and process as those for the invented beverage but using synthetic emulsifiers (mono- and di-glycerides, diacetyl tartaric acid ester of mono- and di-glycerides) and hydrocolloids (carboxymethyl cellulose, microcrystalline cellulose and carrageenan). The results shows higher physical stability of the beverage of this invention (the lower instability index, the higher product physical stability).

Example 2

The RTD beverage was prepared as in Example 1, but with addition of Robusta coffee powder instead of Arabica. Higher content of Robusta coffee (1.8 kg) was added to have the same caffeine content in the final product.

Physico-chemical properties of the beverage were evaluated by instrumental methods and were judged by sensory panelists. No phase separation (syneresis, creaming, marbling, etc.), gelation, and practically no viscosity changes were found during the storage. The beverage had good appearance, mouthfeel, smooth texture and a good flavor without "off" taste.

Example 3

The RTD beverage was prepared as in Example 1, but with no addition of sugar. Results show good physical stability and mouthfeel.

Example 4

The RTD beverage was prepared as in Example 1, but with addition of 5 kg of MCT oil. Lower content of oil resulted in darker color and less creaminess as compared to Example 1. Results show good physical stability and flavor.

Example 5

The RTD beverage was prepared as in Example 1, but with addition of 45 g high acyl gellan gum. Significant increase beverage viscosity was found but gelation was observed.

Example 6

The RTD beverage was prepared as in Example 1, but with addition of 5 g high acyl gellan gum. Physical stability of the beverage was good, but thin texture/mouthfeel was perceived.

Example 7

The RTD beverage was prepared as in Example 1, but without addition of pea proteins. Severe phase separation was observed.

Example 8

The RTD beverage was prepared as in Example 1, but with the addition of 1.1 kg pea protein. The physical stability of the beverage was good, but undesired flavors (beany, bitter, etc.) were perceived.

The invention claimed is:

1. A product comprising:
  a container; and
  a ready to drink coffee beverage filled in the container under aseptic conditions, the ready to drink coffee beverage comprising:
    coffee;
    medium chain triglycerides (MCT);
    high acyl gellan gum;
    plant-based protein; and
    a buffer,
    wherein the coffee is 0.5-2.5 w/w % of the ready to drink coffee beverage, the MCT is 5-10 w/w % of the ready to drink coffee beverage, and the ready to drink coffee beverage has no phase separation during storage at 4-30° C. for at least six months.

2. The product of claim 1, wherein the ready to drink coffee beverage is refrigerated or shelf-stable.

3. The product of claim 1 further comprising an ingredient selected from the group consisting of guar gum, pectin, starch and combinations thereof.

4. The product of claim 1 comprising from 0.01 to 0.04 w/w % of the high acyl gellan gum.

5. The product of claim 1, wherein the plant-based protein is pea protein ranging from 0.3 to 1 w/w % of the ready to drink coffee beverage.

6. The product of claim 1 further comprising from 0 to 10 w/w % sugar.

7. The product of claim 1 comprising sugar selected from the group consisting of sucrose, lactose, glucose, fructose and combinations thereof.

8. The product of claim 1, wherein the buffer is selected from the group consisting of sodium bicarbonate, di-potassium phosphate, citrate salts and combinations thereof.

9. The product of claim 8 comprising from 0 to 0.3 w/w % sodium bicarbonate.

10. A method of producing a ready to drink coffee, the method comprising:

adding a high acyl gellan gum, sugar, and buffer to water to form a first mixture;

adding a plant-based protein and a coffee component to the first mixture to form a second mixture;

adding MCT oil to the second mixture to form a third mixture;

homogenizing the third mixture at about 135/35 bars at 70-80° C. to form an emulsion;

subjecting the emulsion to ultra-high temperature (UHT) treatment for 2-6 sec at 141-148° C.;

cooling the UHT treated emulsion to about 15-25° C. to obtain the ready to drink coffee;

filling the ready to drink coffee in a container under aseptic conditions; and storing the ready to drink coffee in the container at refrigerated or ambient conditions, wherein the ready to drink coffee has no phase separation during storage at 4-30° C. for at least six months.

11. The method of claim 10 further comprising adding an ingredient selected from the group consisting of guar gum, pectin, starch and combinations thereof to the water.

12. The method of claim 10, wherein the ready to drink coffee comprises from 0.01 to 0.04 w/w % of the high acyl gellan gum.

13. The method of claim 10, wherein the plant-based protein is pea protein ranging from 0.3 to 1 w/w % of the ready to drink coffee.

14. The method of claim 10, wherein an amount of the sugar is in a range of up to 10 w/w % of the ready to drink coffee.

15. The method of claim 10, wherein the sugar is selected from the group consisting of sucrose, lactose, glucose, fructose and combinations thereof.

16. The method of claim 10, wherein the buffer is selected from the group consisting of sodium bicarbonate, di-potassium phosphate, citrate salts and combinations thereof.

17. The method of claim 10, wherein the buffer comprises sodium bicarbonate, and the ready to drink coffee comprises from 0 to 0.3 w/w % of the sodium bicarbonate.

18. The method of claim 10, wherein the coffee component is 0.5-2.5 w/w % of the ready to drink coffee, and the MCT oil is 5-10 w/w % of the ready to drink coffee.

19. The method of claim 10, wherein the ready to drink coffee does not include carrageenan.

* * * * *